(12) United States Patent
Alspach et al.

(10) Patent No.: US 11,185,994 B2
(45) Date of Patent: Nov. 30, 2021

(54) DEFORMABLE SENSORS HAVING MULTIPLE TIME-OF-FLIGHT EMITTERS

(71) Applicant: Toyota Research Institute, Inc., Los Altos, CA (US)

(72) Inventors: Alexander Alspach, Somerville, MA (US); Naveen Suresh Kuppuswamy, Arlington, MA (US); Avinash Uttamchandani, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 65 days.

(21) Appl. No.: 16/836,452

(22) Filed: Mar. 31, 2020

(65) Prior Publication Data

US 2021/0299886 A1    Sep. 30, 2021

(51) Int. Cl.
*B25J 13/08*     (2006.01)
*G01L 5/00*      (2006.01)

(52) U.S. Cl.
CPC ........... *B25J 13/084* (2013.01); *B25J 13/085* (2013.01); *G01L 5/009* (2013.01)

(58) Field of Classification Search
CPC ......... G01L 3/10; G01L 5/0061; G01L 3/101; B25J 19/02
USPC ..................................... 73/862.331–862.338
See application file for complete search history.

(56) References Cited

U.S. PATENT DOCUMENTS

| 7,991,510 | B2 | 8/2011 | Duan et al. |
| 8,857,269 | B2 | 10/2014 | Johnson et al. |
| 9,375,531 | B2 | 6/2016 | Lee et al. |
| 2019/0091871 | A1 | 3/2019 | Alspach et al. |
| 2019/0091872 | A1* | 3/2019 | Alspach ................... G01L 1/04 |
| 2020/0246980 | A1* | 8/2020 | Kuppuswamy ....... G01L 5/0061 |
| 2020/0254624 | A1* | 8/2020 | Alspach ................. G01L 5/009 |

FOREIGN PATENT DOCUMENTS

| FR | 2235565 A1 | 1/1975 |
| WO | 2010065398 A1 | 6/2010 |

OTHER PUBLICATIONS

Kuppuswamy, et al., "Fast Model-Based Contact Patch and Pose Estimation for Highly Deformable Dense-Geometry Tactile Sensors", MIT paper, URL: http://groups.csail.mit.edu/robotics-center/public_papers/Kuppuswamy20.pdf, Published Sep. 19, 2019.

* cited by examiner

*Primary Examiner* — Octavia Hollington
(74) *Attorney, Agent, or Firm* — Dinsmore & Shohl LLP

(57) ABSTRACT

A deformable sensor for detecting a pose and force associated with an object is provided. The deformable sensor includes a housing, a deformable membrane coupled to an upper portion of the housing, an enclosure defined by the housing and the deformable membrane and configured to be filled with a medium, a time-of-flight receiver positioned within the enclosure and a plurality of time-of-flight emitters arranged around the time-of-flight receiver within the enclosure. The plurality of time-of-flight emitters are configured to emit signals toward the deformable membrane at different times. The time-of-flight receiver is configured to receive signals reflected from the deformable membrane.

20 Claims, 9 Drawing Sheets

US 11,185,994 B2

DEFORMABLE SENSORS HAVING MULTIPLE TIME-OF-FLIGHT EMITTERS

TECHNICAL FIELD

Embodiments described herein generally relate to contact sensors and, more particularly, to deformable contact and geometry/pose sensors including a time-of-flight sensor comprising a plurality of emitters associated with a single receiver.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, a deformable end effector may be desirable in robot-human interactions.

SUMMARY

In one embodiment, a deformable sensor for detecting a pose and force associated with an object is provided. The deformable sensor includes a housing, a deformable membrane coupled to an upper portion of the housing, an enclosure defined by the housing and the deformable membrane and configured to be filled with a medium, a time-of-flight receiver positioned within the enclosure and a plurality of time-of-flight emitters arranged around the time-of-flight receiver within the enclosure. The plurality of time-of-flight emitters are configured to emit signals toward the deformable membrane at different times. The time-of-flight receiver is configured to receive signals reflected from the deformable membrane.

In another embodiment, a method for detecting a pose associated with an object is provided. The method includes preparing a time-of-flight receiver within an enclosure defined by a housing and a deformable membrane coupled to an upper portion of the housing, arranging a plurality of time-of-flight emitters around the time-of-flight receiver, the plurality of time-of-flight emitters being arranged at a predetermined distance from the time-of-flight receiver, emitting, using the plurality of time-of-flight emitters, signals at different times, and receiving, by the time-of-flight receiver, the signals reflected from the deformable membrane.

In yet another embodiment, a controller for a deformable sensor comprising a housing, a deformable membrane coupled to an upper portion of the housing, and an enclosure defined by the housing and the deformable membrane and configured to be filled with a medium is provided. The controller includes one or more processors, one or more memory modules communicatively coupled to the one or more processors, and machine readable instructions stored in the one or more memory modules that, when executed by the one or more processors, cause the one or more processors to instruct a plurality of time-of-flight emitters arranged around a time-of-flight receiver within the enclosure to emit signals at different times, and obtain, from the time-of-flight receiver within the enclosure, the signals reflected from the deformable membrane.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to detecting, using a time-of-flight sensor, a shape of deformable/compliant contact and/or geometry sensors (hereinafter "deformable sensors") that detect contact. Time of flight sensors generally need sufficient space to emit a signal and receive the reflected signal to accurately determine a distance. A deformable sensor may not have enough space for a time of flight sensor positioned within the deformable sensor to emit a signal and receive the signal reflected from a deformable membrane. When the distance between the deformable membrane and the time-of-flight becomes too short, the time-of-flight emitter may be too bright and the effect of the emitter-receiver offset may become non-negligible. Embodiments of the present disclosure addresses the above issues due to close-range imaging. According to the present disclosure, a deformable sensor for detecting a pose and force associated with an object is provided. The deformable sensor includes a housing, a deformable membrane coupled to an upper portion of the housing, an enclosure defined by the housing and the deformable membrane and configured to be filled with a medium, a time-of-flight receiver positioned within the enclosure and a plurality of time-of-flight emitters arranged around the time-of-flight receiver within the enclosure. The plurality of time-of-flight emitters are configured to emit signals toward the deformable membrane at different times. That is, there is a time difference between when one of time-of-flight emitter emits signals toward the deformable membrane and when another time-of-flight emitter emits signals toward the deformable membrane. The time-of-flight receiver is configured to receive signals reflected from the deformable membrane. By staggering the emission of signals from emitters at different times, the glare and/or shadows can be determined from each sensed signals and mathematically eliminated or ignored when merging the data related to reflected signals originated from the plurality of time-of-emitters.

Figure 1A:
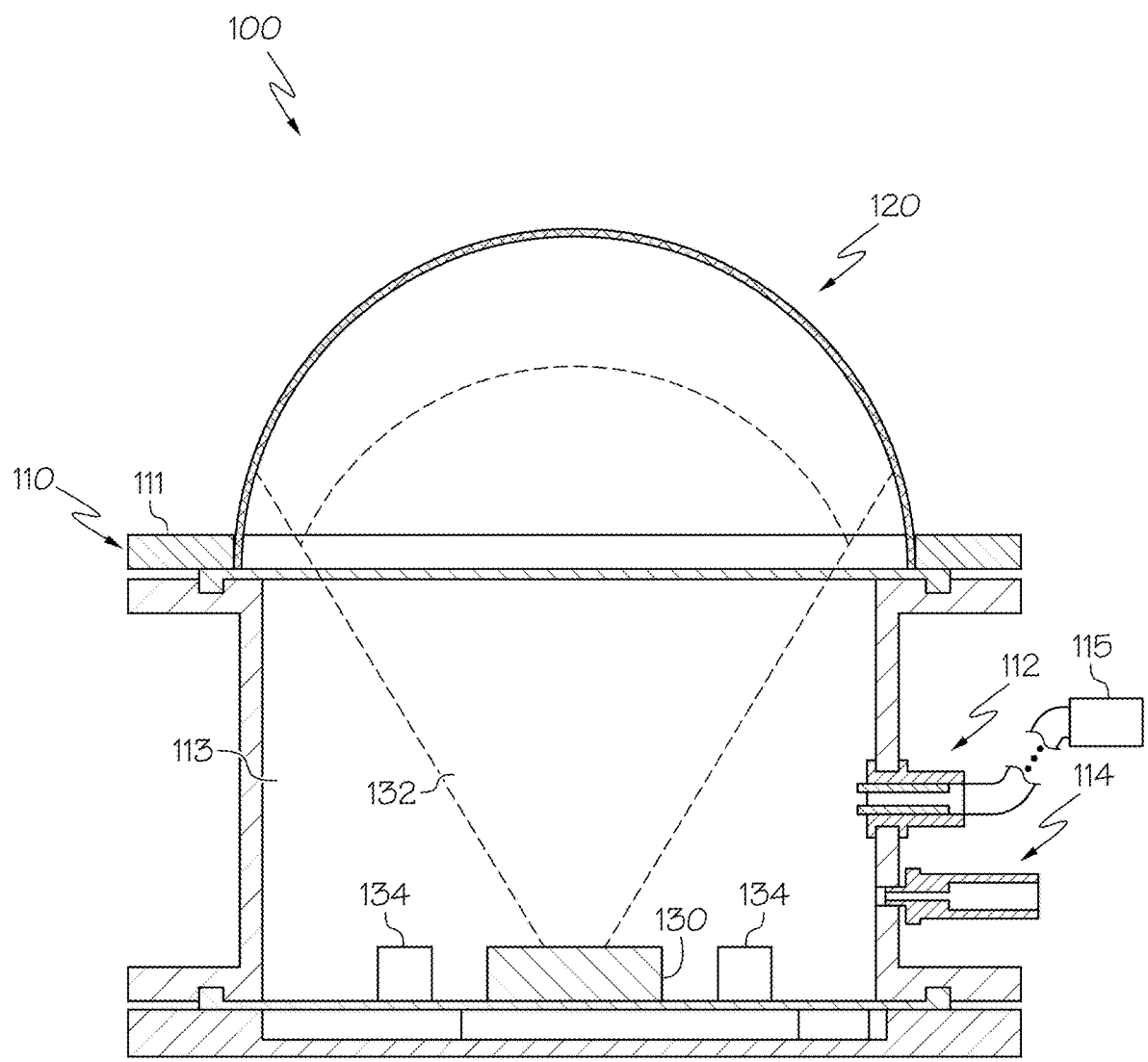
FIG. 1A schematically depicts an elevation view of an example deformable sensor according to one or more embodiments described and illustrated herein.
Figure 1B:
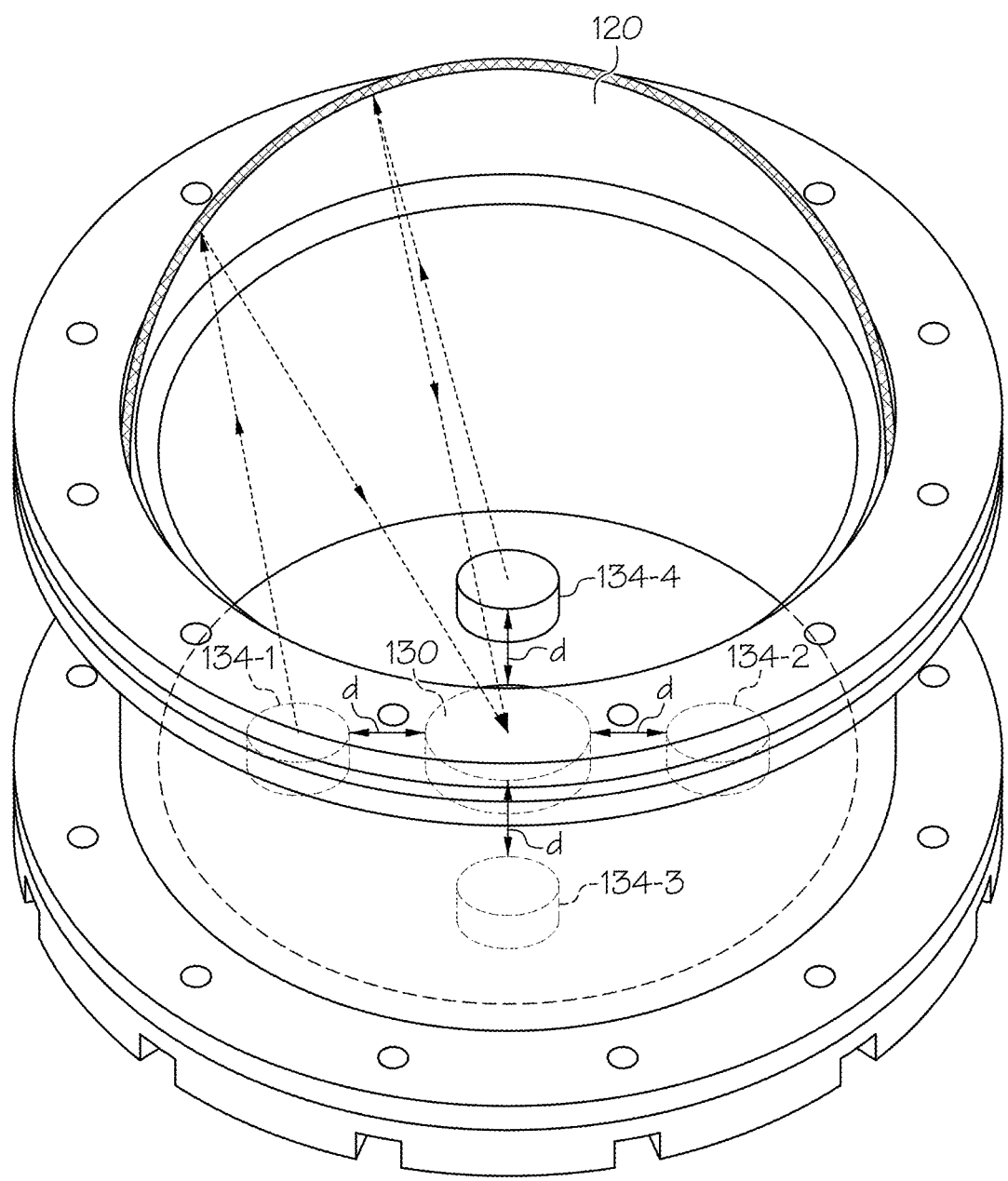
FIG. 1B schematically depicts a top perspective view of the example deformable sensor depicted by FIG. 1 according to one or more embodiments described and illustrated herein.

Referring now to FIGS. 1A and 1B, an example deformable sensor 100 is schematically illustrated. FIG. 1A is a front elevation view of the example deformable sensor 100. FIG. 1B depicts arrangement of a plurality of time-of-flight emitters and a single time-of-flight receiver in the example deformable sensor 100 of FIG. 1A. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1A, although any suitable shape may be utilized in other embodiments. The passthrough 112 may be connected to a pump 115 which provides gas, such as air, into the enclosure 113 or sucks the gas from the enclosure 113 to adjust the shape and/or size of the deformable membrane 120. In another example, the medium is a gel, such as silicone or other rubber-like substance. In some embodiments, a substance such as solid silicone may be cast in a given shape before assembly of the deformable sensor 100. In various embodiments, the medium may be anything that is transparent to an internal sensor (discussed in more detail below), such as to a wavelength of a time-of-flight sensor. The medium may include clear/transparent rubbers in some embodiments. In other embodiments, the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments, robots feature varying touch sensitivity due to varying spatial resolution and/or depth resolution.

A plurality of time-of-flight emitters 134 along with a time-of-flight receiver 130 may be disposed within the enclosure 113. The combination of the time-of-flight emitters 134 and the time-of-flight receiver 130 may operate as a time-of-flight sensor detecting a bottom surface of the deformable membrane 120. The distance between the bottom surface of the deformable membrane 120 and the time-of-flight receiver 130 is relatively short. For example, the distance may be between 0.1 meter and 0.4 meter. When an external object depresses the deformable membrane 120 from outside, the distance may be reduced. Each of the plurality of time-of-flight emitters 134 and the time-of-flight receiver 130 may have a field of view 132 directed through the medium and toward a bottom surface of the deformable membrane 120. In some embodiments, the time-of-flight receiver 130 may be an optical sensor.

As described in more detail below, the combination of the time-of-flight emitters 134 and the time-of-flight receiver 130 may be capable of detecting deflections of the deformable membrane 120 when the deformable membrane 120 comes into contact with an object. In one example, each of the time-of-flight emitters 134 emits an optical signal (e.g., an infrared signal), and the time-of-flight receiver 130 has individual detectors (i.e., "pixels") that detect how long it takes for the reflected signal to return to the sensor. For example, each of the time-of-flight emitters 134 may emit an electrically modulated light toward the deformable membrane 120. The time-of-flight receiver 130 may receive the electrically modulated light reflected from the deformable membrane 120. A processor (e.g., a processor 302 in FIG. 3) of the deformable sensor 100 (or a processor of a computing device that is remote from the deformable sensor 100) may determine an amount of time that the electrically modulated light traveled between each of the time-of-flight emitters 134 and the time-of-flight receiver 130. The processor may convolute the electrically modulated light and reflected modulated light and determine a phase delay between the two lights. Based on the phase delay, the processor may determine the amount of time that the electrically modulated light traveled between each of the time-of-flight emitters 134 and the time-of-flight receiver 130.

Referring to FIG. 1B, the deformable sensor 100 may include four time-of-flight emitters 134-1, 134-2, 134-3, 134-4 and one time-of-flight receiver 130. The four time-of-flight emitters 134-1, 134-2, 134-3, 134-4 and one time-of-flight receiver 130 are disposed within the enclosure of the deformable sensor 100. While FIG. 1B depicts the deformable sensor 100 having four time-of-flight emitters, the deformable sensor 100 may have more than or less than four time-of-flight emitters. Each of the four time-of-flight emitters 134-1, 134-2, 134-3, 134-4 may be equally spaced apart from each other, and may be spaced apart from the time-of-flight receiver 130. For example, the distance between each of the four time-of-flight emitters 134-1, 134-2, 134-3, 134-4 and the time-of-flight receiver 130 may be the same as a distance d as illustrated in FIG. 1B. The arrangement of the plurality of time-of-flight emitters 134 are not limited to the arrangement illustrated in FIG. 1B, and may be any different arrangement. For example, one or more of the time-of-flight emitters 134 may be closer to or farther away from the time-of-flight receiver 130 than the rest of the time-of-flight emitters 134.

In embodiments, the plurality of time-of-flight emitters 134 may emit signals at different times, respectively, such that no two time-of-flight emitters emit signals at the same time. Since emission and sensing of signals at close distances inherently cause glare and/or shadows due to the characteristics of the material used for the deformable membrane (e.g., latex), by staggering the emission of signals from emitters at different times, the glare and/or shadows can be determined from each sensed signals and mathematically eliminated or ignored when merging the data related to reflected signals originated from the plurality of time-of-flight emitters 134. The details of emitting signals at different times will be described in detail with reference to FIG. 2 below.

The time-of-flight sensor may have any desired spatial resolution. The greater the number of pixels, the greater the spatial resolution. The spatial resolution of the sensor disposed within the time-of-flight sensor may be changed. In some cases, low spatial resolution (e.g., one "pixel" that detects a single point's displacement) may be desired. In other examples, a sensitive time-of-flight sensor such may be used as a high spatial resolution time-of-flight sensor that provides dense tactile sensing. Thus, the time-of-flight sensor may be modular because the sensors may be changed depending on the application.

Referring again to FIG. 1A, a conduit 114 may be utilized in the enclosure 113 to provide power and/or data/signals, such as to the time-of-flight emitters 134 and the time-of-flight receiver 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless time-of-flight emitters 134 and time-of-flight receiver 130 to transmit and/or receive data and/or power. In various embodiments where the medium is not a gas, such as silicone, the enclosure 113 and/or conduit 114 may not necessarily be airtight.

In some embodiments, the deformable sensor 100 may include one or more internal pressure sensors (barometers, pressure sensors, etc., or any combination thereof) utilized to detect the general deformation of the deformable membrane 120 through the medium. In some embodiments, the deformable sensor 100, and/or the internal pressure sensors may receive/send various data, such as through the conduit 114 discussed above, wireless data transmission (Wi-Fi, Bluetooth®, etc.), or any other suitable data communication protocol. For example, pressure within the deformable sensor 100 may be specified by a pressurization parameter and may be inversely proportional to the deformability of the deformable sensor 100. In some embodiments, the deformability of a deformable sensor 100 may be modified by changing pressure within the enclosure 113 or a material of the deformable membrane 120. In some embodiments, receipt of an updated parameter value may result in a real-time or delayed update (pressurization, etc.).

While the plurality of time-of-flight emitters and a single time-of-flight receiver are used to detect a shape of the deformable membrane of a deformable sensor, the plurality of time-of-flight emitters and the single time-of-flight receiver may be used to detect a surface of different objects.

Figure 2:
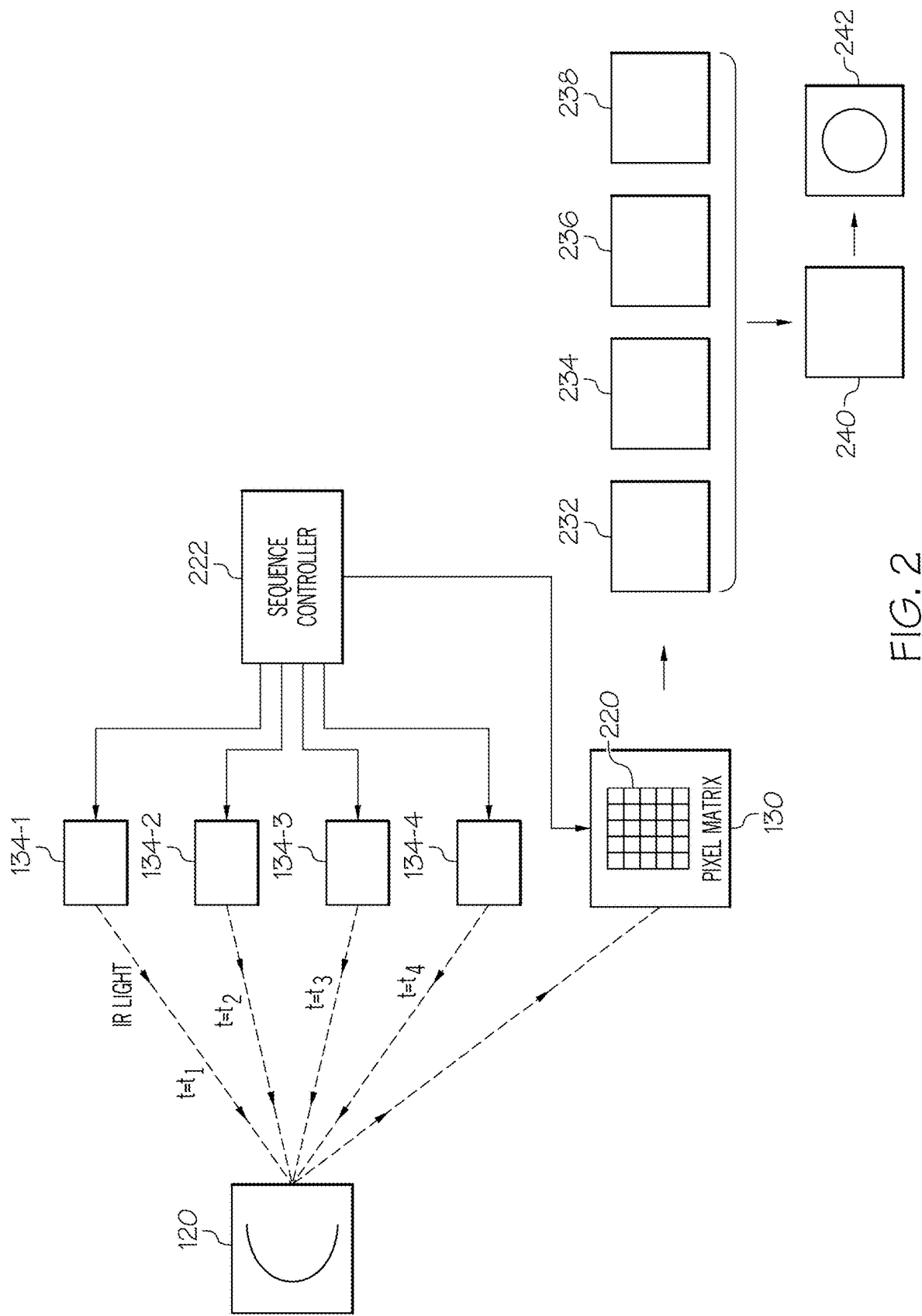
FIG. 2 depicts a schematic diagram for detecting a shape of a deformable membrane using a plurality of time-of-flight emitters, according to one or more embodiments shown and described herein.

FIG. 2 depicts a schematic diagram for detecting a deformable membrane using a plurality of time-of-flight emitters, according to one or more embodiments shown and described herein.

A non-limiting example time-of-flight sensor may include the plurality of time-of-flight emitters 134-1, 134-2, 134-3, 134-4, a time-of-flight receiver 130, and a sequence controller 222. The sequence controller 222 may generate and provide electrical modulation signals to each of the time-of-flight emitters 134-1, 134-2, 134-3, 134-4. The sequence controller 222 may also provide timing information about when each of the time-of-flight emitters 134-1, 134-2, 134-3, 134-4 transmits signals. Each of the time-of-flight emitters 134-1, 134-2, 134-3, 134-4 may emit electrically modulated lights based on the electrical modulation signals received from the sequence controller 222. For example, the time-of-flight emitter 134-1 emits electrically modulated light at time $t_1$ towards the deformable membrane 120. At time $t_2$, the time-of-flight emitter 134-2 emits electrically modulated light towards the deformable membrane 120. At time $t_3$, the time-of-flight emitter 134-3 emits electrically modulated light towards the deformable membrane 120. At time $t_4$, the time-of-flight emitter 134-4 emits electrically modulated light towards the deformable membrane 120.

The time-of-flight receiver 130 may include a pixel matrix 220. The pixel matrix may have a resolution of, for example, 224×171 pixels, and provide depth images at up to 45 fps. It should be understood that other resolutions may be utilized. The pixel matrix 220 may obtain raw data including timing information about signals reflected from the deformable membrane. The pixel matrix 220 may obtain a plurality of raw data corresponding to the plurality of time-of-flight emitters 134-1, 134-2, 134-3, 134-4. For example, the pixel matrix 220 may obtain first three-dimensional raw data 232 corresponding to the signals emitted by the time-of-flight emitter 134-1, second three-dimensional raw data 234 corresponding to the signals emitted by the time-of-flight emitter 134-2, third three-dimensional raw data 236 corresponding to the signals emitted by the time-of-flight emitter 134-3, fourth three-dimensional raw data 238 corresponding to the signals emitted by the time-of-flight emitter 134-4. Because the plurality of time-of-flight emitters 134-1, 134-2, 134-3, 134-4 emit signals at different times, the pixel matrix 220 may obtain the three-dimensional raw data 232, 234, 236, 238 separately.

The time-of-flight receiver 130 may transmit the three-dimensional raw data 232, 234, 236, 238 to a processor such as the processor 302 in FIG. 2 which then merges the three-dimensional raw data 232, 234, 236, 238 to obtain merged data 240. Then, the processor may obtain a depth image 242 based on the merged data 240. The processor 302 may be on-board the deformable sensor 100 or provided in a remote computing device.

Figure 3:
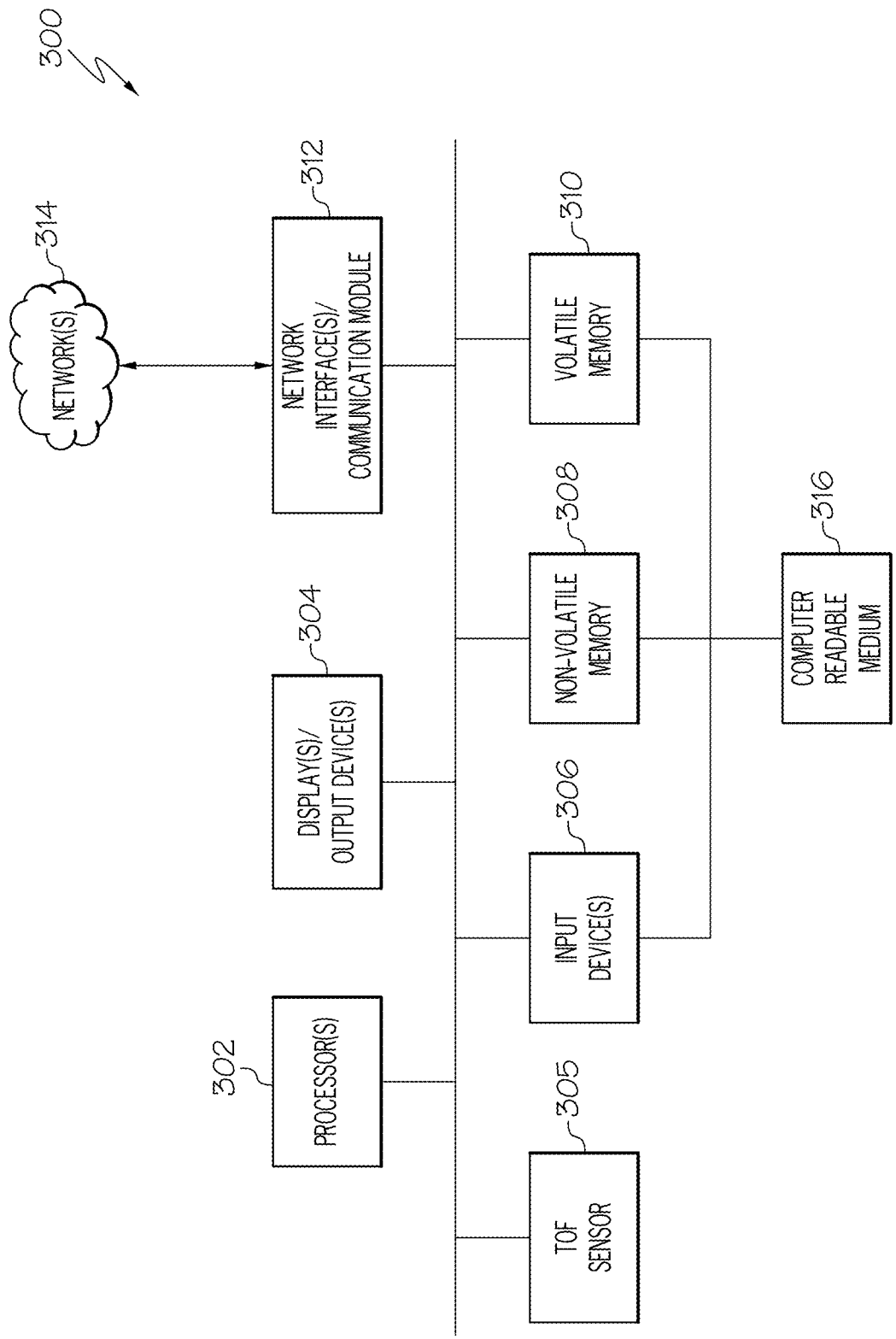
FIG. 3 is a block diagram illustrating computing hardware utilized in one or more devices for implementing various processes and systems, according one or more embodiments described and illustrated herein.
Figure 8:
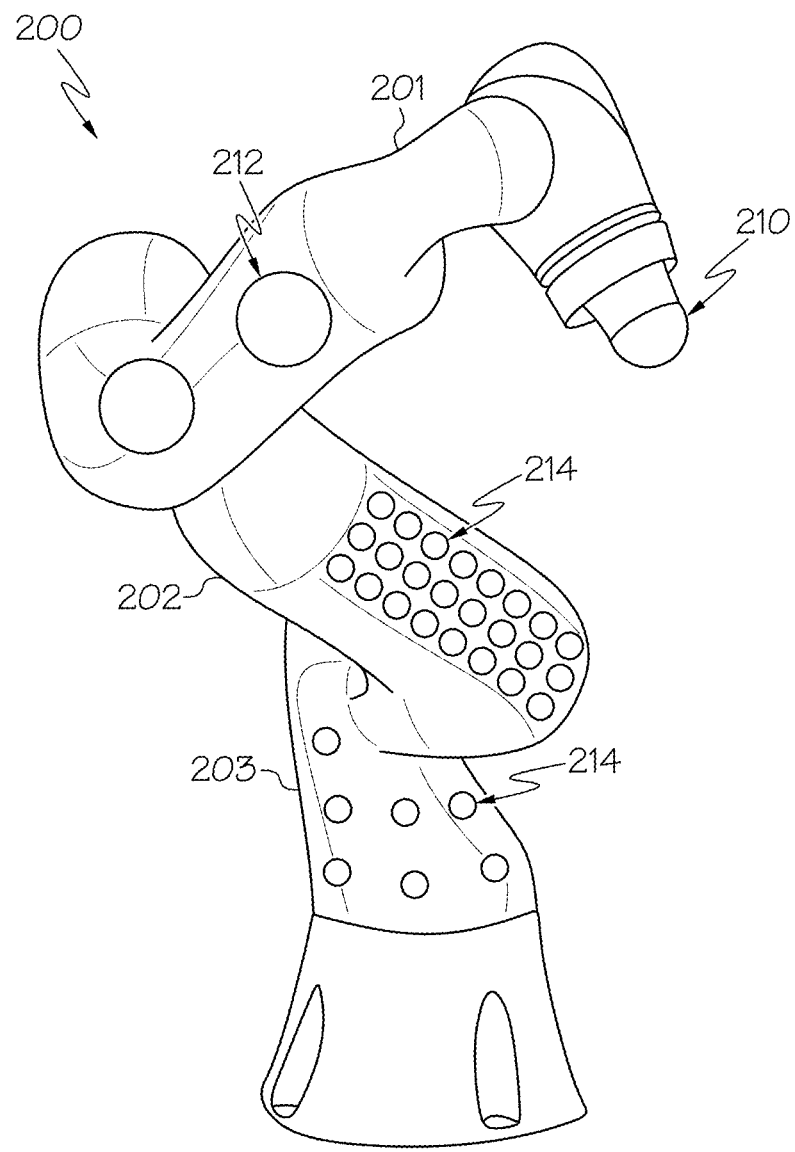
FIG. 8 schematically depicts an example robot having a plurality of deformable sensors according to one or more embodiments described and illustrated herein.

FIG. 3 depicts a block diagram illustrating an example of a computing device 300, through which embodiments of the disclosure can be implemented, such as (by way of non-limiting example) the deformable sensor 100, the time-of-flight sensor 305, the robot 200 in FIG. 8, or any other device described herein. The computing device 300 described herein is but one example of a suitable computing device and does not suggest any limitation on the scope of any embodiments presented. Nothing illustrated or described with respect to the computing device 300 should be interpreted as being required or as creating any type of dependency with respect to any element or plurality of elements. In various embodiments, a computing device 300 may include, but need not be limited to, the deformable sensor 100, the time-of-flight sensor 305, and/or the robot 200. In an embodiment, the computing device 300 includes at least one processor 302 and memory (non-volatile memory 308 and/or volatile memory 310). The computing device 300 can include one or more displays and/or output devices 304 such as monitors, speakers, headphones, projectors, wearable-displays, holographic displays, and/or printers, for example. The computing device 300 may further include one or more input devices 306 which can include, by way of example, any type of mouse, keyboard, disk/media drive, memory stick/thumb-drive, memory card, pen, touch-input device, biometric scanner, voice/auditory input device, motion-detector, camera, scale, etc. The processor 302 may include the sequence controller 222 in FIG. 2.

The computing device 300 may include a time-of-flight sensor 305. The time-of-flight sensor 305 may include a plurality of time-of-flight emitters and a time-of-flight receiver, e.g., the time-of-flight emitters 134-1, 134-2, 134-3, 134-4 and a time-of-flight receiver 130 in FIG. 1B. The time-of-flight receiver 130 may transmit measured data to the processor 302 for further processing.

The computing device 300 may include non-volatile memory 308 (ROM, flash memory, etc.), volatile memory 310 (RAM, etc.), or a combination thereof. A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 312 can be communicatively coupled to any device capable of transmitting and/or receiving data via the network 314. Accordingly, the hardware of the network interface 312 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 316 may comprise a plurality of computer readable mediums, each of which may be either a computer readable storage medium or a computer readable signal medium. A computer readable storage medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a robot 200 and/or a server may utilize a computer readable storage medium to store data received from the time-of-flight receiver 130 on the robot 200. The computer readable storage medium may store machine readable instructions that may be executed by the processor 302. The machine readable instructions, when executed by the processor 302, cause the processor 302 to instruct a plurality of time-of-flight emitters arranged around a time-of-flight receiver within the enclosure to emit signals at different times, obtain, from the time-of-flight receiver within the enclosure, the signals reflected from the deformable membrane, obtain a plurality of three dimensional raw data based on the reflected signals, merge the plurality of three dimensional raw data, and obtain a depth image based on the merged plurality of three dimensional raw data.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 300 may include one or more network interfaces 312 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot 200. A network interface 312 may also be described as a communications module, as these terms may be used interchangeably.

Figure 4:
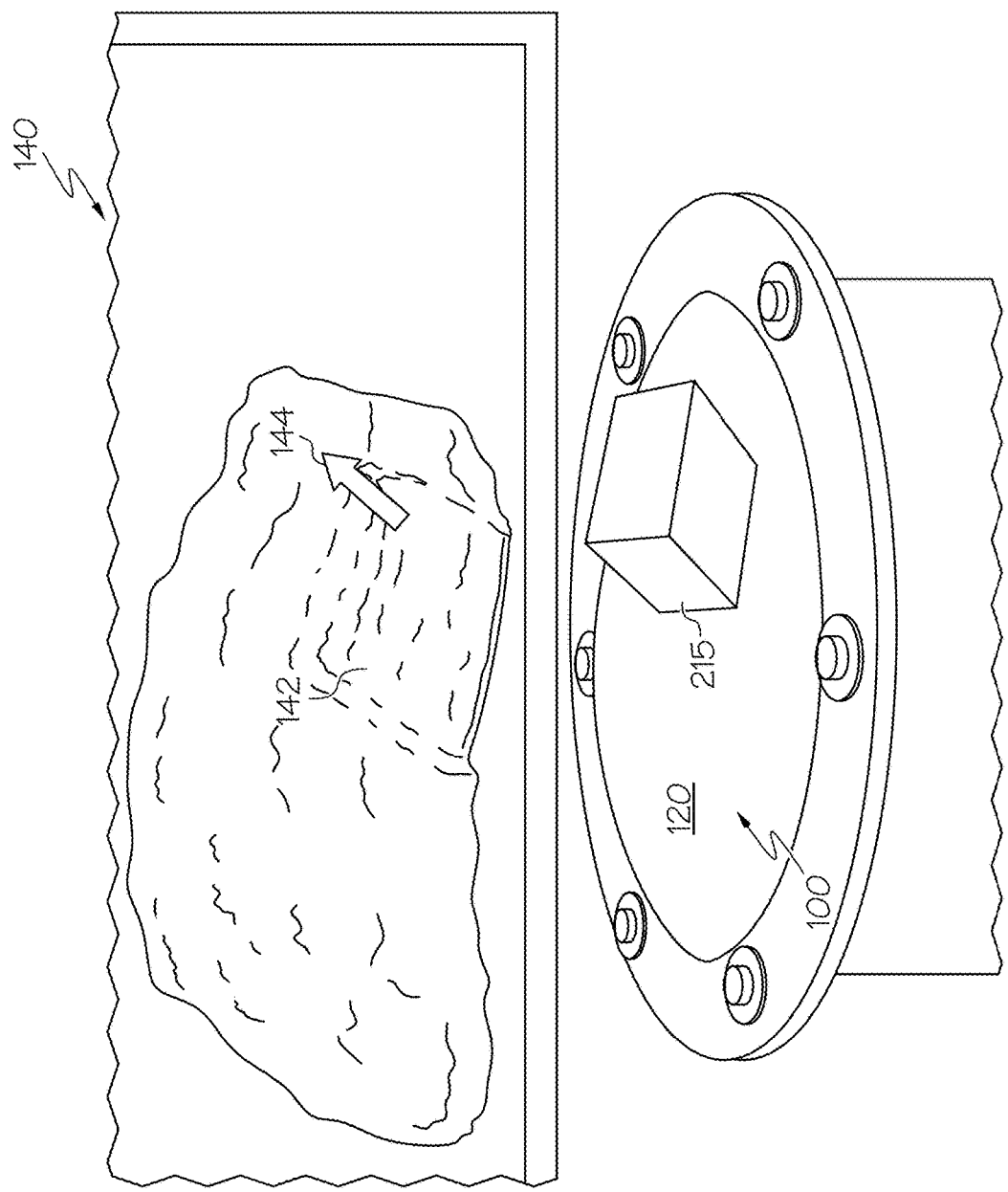
FIG. 4 depicts an image of an example object displacing the deformable membrane of the example deformable sensor, according one or more embodiments described and illustrated herein.

FIG. 4 depicts an image of an example object 215 displacing the deformable membrane 120 of the example deformable sensor 100. In the illustrated embodiment, a display device 140 outputs for display on a device, output of the deformable sensor 100 in real time as an object 215 contacts and/or deforms the deformable membrane 120. It should be understood that the display device 140 is provided for illustrative purposes only, and that embodiments may be utilized without a display device. As the object 215 is pressed into the deformable membrane 120, the object 215 imparts its shape into the deformable membrane 120 such that the deformable membrane 120 conforms to the shape of the object 215. The spatial resolution of the time-of-flight receiver 130 may be such that the time-of-flight receiver 130 detects the geometry and/or pose of the displaced deformable membrane 120 by detecting signals reflected from the displaced deformable membrane 120. For example, the optical signal that is reflected off of the bottom surface of the deformable membrane 120 that is being deflected by the object has a shorter time-of-flight than the optical signal that is reflected by the deformable membrane 120 at a region outside of the deflected region. Thus, a contact region 142 (or displaced region, used herein interchangeably) having a geometry and/or pose matching the shape of the object 215 may be outputted and displayed on the display device 140.

The deformable sensor 100 therefore not only may detect the presence of contact with the object 215, but also the geometry of the object 215. In this manner, a robot equipped with a deformable sensor 100 may determine the geometry of an object based on contact with the object. Additionally, a geometry and/or pose of the object 215 may also be determined based on the geometric information sensed by the deformable sensor 100. For example, a vector 144 that is normal to a surface in the contact region 142 may be displayed, such as when determining the pose of the object 215. The vector 144 may be used by a robot or other device to determine which direction a particular object 215 may be oriented, for example.

Figure 5:
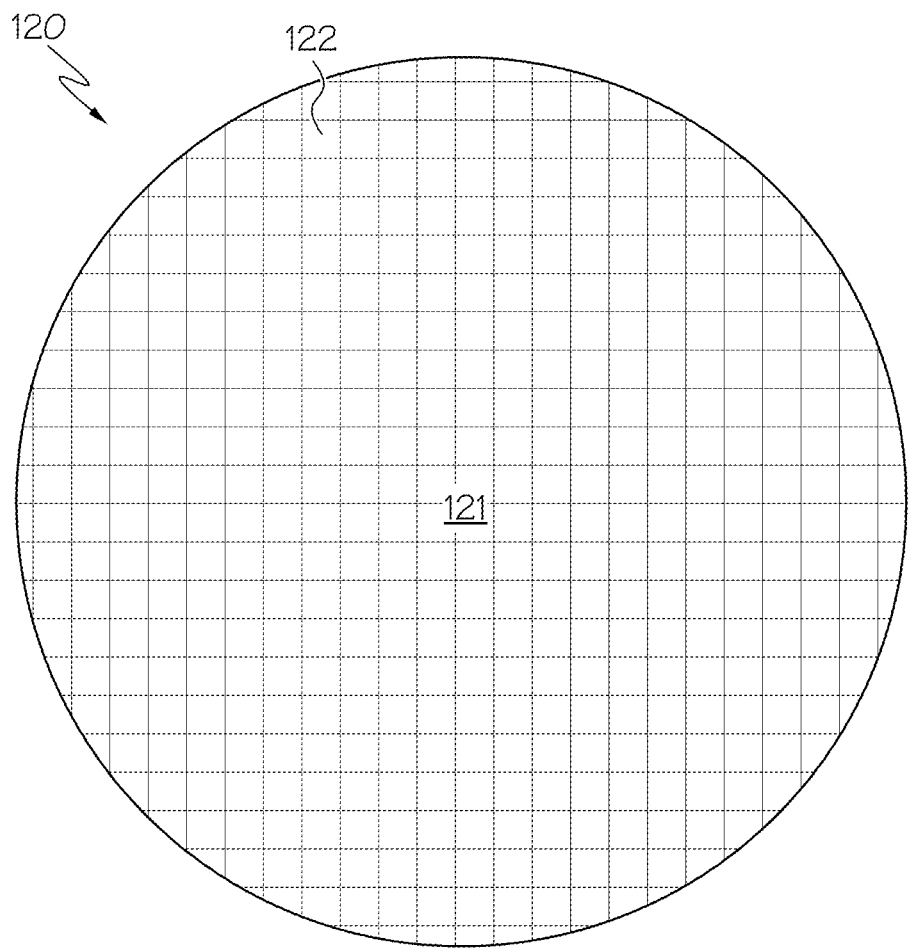
FIG. 5 schematically depicts a pattern on a bottom surface of a deformable membrane of a deformable sensor according to one or more embodiments described and illustrated herein.

Referring now to FIG. 5, a grid pattern 122 may be applied to a bottom surface 121 of the deformable membrane 120 to assist in the detection of the deformation of the deformable membrane 120. The grid pattern 122 may assist in the detection of the deformation. For example, varying degrees of distortion to the grid pattern 122 may be utilized to discern how much deformation has occurred. In this example, the distance between parallel lines and/or measuring curvature of lines in the grid pattern 122 may be used to determine the amount of deformation at each point in the grid. It should be understood that embodiments are not limited to grid patterns, as other types of patterns are possible, such as dots, shapes, and the like. The pattern on the bottom surface 121 may be random, and not necessarily arranged in a grid pattern 122 or an array as shown in FIG. 5.

Figure 6:
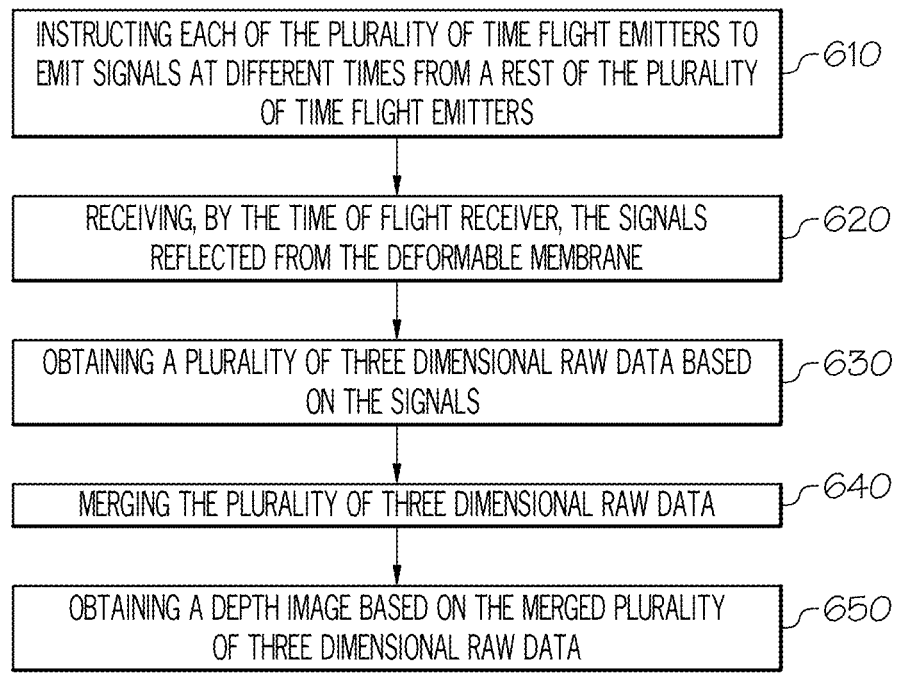
FIG. 6 depicts a flowchart for detecting a shape of a deformable membrane using a plurality of time-of-flight emitters, according to one or more embodiments shown and described herein.

FIG. 6 depicts a flowchart for detecting the shape of the deformable membrane of the deformable sensor, according to one or more embodiments shown and described herein.

In step 610, a controller of the deformable sensor instructs each of the plurality of time-of-flight emitters to emit signals at different times from the rest of the plurality of time-of-flight emitters. Referring to FIGS. 1B and 2, the sequence controller 222 of the deformable sensor 210 may provide timing information about when each of the time-of-flight emitters 134-1, 134-2, 134-3, 134-4 transmits signals. Each of the time-of-flight emitters 134-1, 134-2, 134-3, 134-4 may emit signals, e.g., electrically modulated lights, based on the electrical modulation signals received from the sequence controller 222. For example, at time $t_1$ the time-of-flight emitter 134-1 emits electrically modulated light towards the deformable membrane 120. At time $t_2$, the time-of-flight emitter 134-2 emits electrically modulated light towards the deformable membrane 120. At time $t_3$, the time-of-flight emitter 134-3 emits electrically modulated light towards the deformable membrane 120. At time $t_4$, the time-of-flight emitter 134-4 emits electrically modulated light towards the deformable membrane 120.

The plurality of time-of-flight emitters 134-1, 134-2, 134-3, 134-4 are arranged around the time-of-flight receiver 130. The plurality of time-of-flight emitters 134-1, 134-2, 134-3, 134-4 may be arranged at a predetermined distance from the time-of-flight receiver 130. The plurality of time-of-flight emitters 134-1, 134-2, 134-3, 134-4 may be equally spaced apart from each other. For example, the plurality of time-of-flight emitters 134-1, 134-2, 134-3, 134-4 are arranged such that plurality of time-of-flight emitters 134-1, 134-2, 134-3, 134-4 are positioned at the four corners of a virtual square. The arrangement of the time-of-flight emitters may varied depending on the number of time-of-flight emitters. For example, if the number of time-of-flight emitters is three, the time-of-flight emitters may be arranged to constitute a triangle. If the number of time-of-flight emitters is six, the time-of-flight emitters may be arranged to constitute a hexagon.

In step 620, the time-of-flight receiver receives the signals reflected from the deformable membrane. Referring to FIGS. 1B and 2, the pixel matrix 220 of the time-of-flight receiver 130 receives signals reflected form the deformable membrane 120. Specifically, the pixel matrix 220 of the time-of-flight receive 130 receives signals that were originated from the time-of-flight emitter 134-1 and reflected by the deformable membrane 120. Then, the pixel matrix 220 of the time-of-flight receive 130 sequentially receives signals that were originated from the time-of-flight emitter 134-2, 134-3, 134-4 and reflected from the deformable membrane 120.

In step 630, the time-of-flight receiver obtains a plurality of three dimensional raw data based on the signals. Referring to FIGS. 1B and 2, the pixel matrix 220 of the time-of-flight receiver 130 may obtain a plurality of raw data corresponding to the plurality of time-of-flight emitters 134-1, 134-2, 134-3, 134-4. For example, the pixel matrix 220 may obtain first three dimensional raw data 232 corresponding to the signals emitted by the time-of-flight emitter 134-1, second three dimensional raw data 234 corresponding to the signals emitted by the time-of-flight emitter 134-2, third three dimensional raw data 236 corresponding to the signals emitted by the time-of-flight emitter 134-3, fourth three dimensional raw data 238 corresponding to the signals emitted by the time-of-flight emitter 134-4. Because the plurality of time-of-flight emitters 134-1, 134-2, 134-3, 134-4 emit signals at different times, the pixel matrix 220 may obtain the three dimensional raw data 232, 234, 236, 238 separately. The time-of-flight receiver 130 transmits the three dimensional raw data 232, 234, 236, 238 to a processor such as the processor 302 in FIG. 3 for further processing.

In step 640, the processor merges the plurality of three dimensional raw data. Referring to FIG. 2, the processor may merge the plurality of three dimensional raw data 232, 234, 236, 238 to obtain merged data 240. In embodiments, the processor may average the plurality of three dimensional raw data 232, 234, 236, 238 to obtain merged data 240. In some embodiments, the processor may compare the plurality of three dimensional raw data 232, 234, 236, 238, eliminate outliers among the plurality of three dimensional raw data 232, 234, 236, 238, and average the remaining data.

In step 650, the processor obtains a depth image based on the merged plurality of three dimensional raw data. Referring to FIG. 2, the processor may obtain a depth image 242 based on the merged data 240.

Figure 7A:
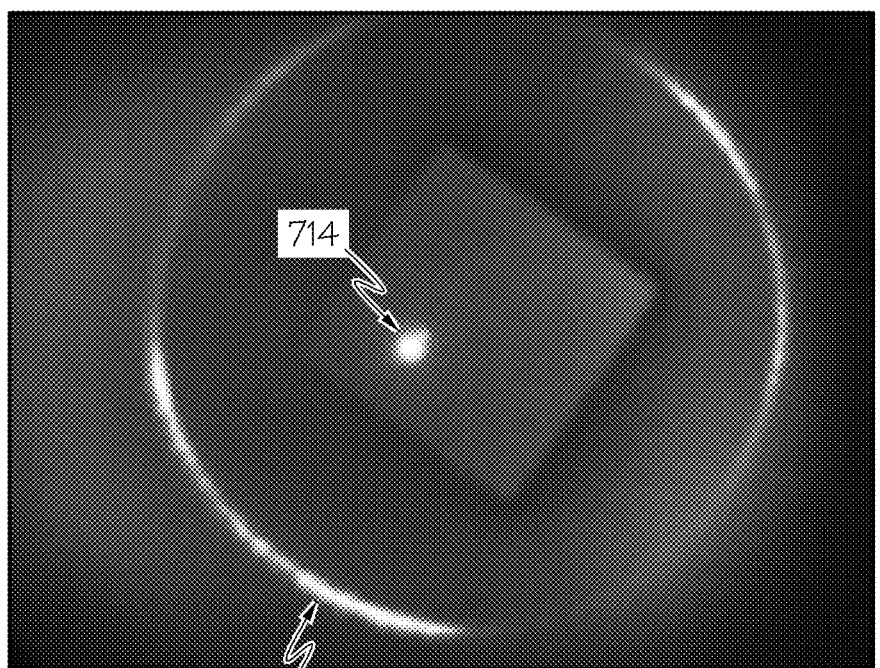
FIG. 7A depicts an example infrared image including bright spots during close-range imaging.
Figure 7B:
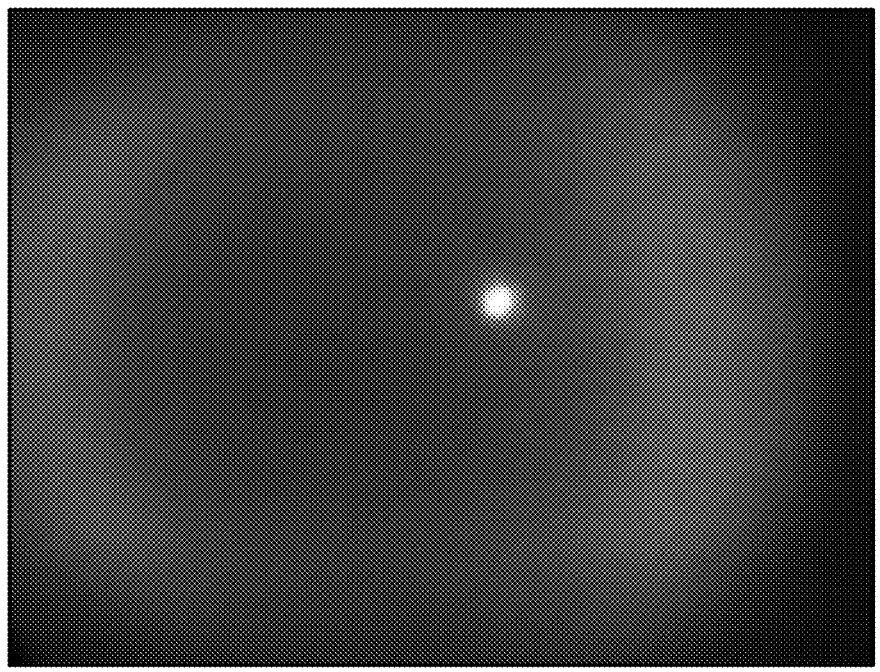
FIG. 7B depicts an example infrared image including a dimly illuminated area during close-range imaging.

Obtaining a depth image using a plurality of time-of-flight emitters enhances accuracy of detecting an external object on a deformable sensor. When an external object depresses the deformable membrane of the deformable sensor as shown in FIG. 4, the distance between the deformable membrane and the time-of-flight receiver decreases. When the distance between the deformable membrane and the time-of-flight receiver becomes too short, the time-of-flight emitter may be too bright. For example, a time-of-flight emitter may produce bright spots on regions of the inner surface of the deformable membrane causes sensor saturation as shown in FIG. 7A. Bright spots 712 and 714 may be observed due to excess emitter intensity. In addition, when the distance between the deformable membrane and the time-of-flight receiver becomes too short, the effect of the emitter-receiver offset becomes non-negligible. For example, the offset between the time-of-flight emitter and the time-of-flight receiver may leave a poorly illuminated region. Specifically, the dimly illuminated area to the right of the image in FIG. 6B may form during close-range imaging as a result of the time-of-flight emitter and the time-of-flight receiver field of view offset. The present disclosure addresses the above issues due to close-range imaging. Specifically, by staggering the emission of signals from emitters at different times, the glare and/or shadows can be determined from each sensed signals and mathematically eliminated or ignored when merging the data related to reflected signals originated from the plurality of time-of-emitters.

FIG. 8 depicts a robot including a plurality of deformable sensors, according to one or more embodiments shown and described herein.

In embodiments, a robot 200 may include a plurality of deformable sensors 210, 212 and 214 at different locations. Each of the plurality of deformable sensors 210, 212, and 214 may have similar structure as the deformable sensor 100 illustrated in FIGS. 1A and 1B. The deformable sensor 210 may act as an end effector of the robot 200, and have a high spatial resolution and/or depth resolution. In some embodiments, the deformability of the deformable sensor 210 may be a function of some combination of the material of the deformable membrane 120 and the internal pressure within the deformable sensor 210. In some embodiments, the deformable sensor 210 may have a clamp or other suitable attachment mechanism. For example, the deformable sensor 210 may be removably attached to the robot 200. Any suitable type of clamp, fastener, or attachment mechanism may be utilized in some embodiments.

Each of the deformable sensors 210, 212, and 214 may have a desired spatial resolution and/or a desired depth resolution depending on its location on the robot 200. In the illustrated embodiment, deformable sensors 212 are disposed on a first arm portion 201 and a second arm portion 202 (the terms "arm portion" and "portion" being used interchangeably throughout). An arm portion may have one or more deformable sensors 212, or none at all. The deformable sensors 212 may be shaped to conform to the shape of the first arm portion 201 and/or the second arm portion 202. It may be noted that the deformable sensors 212 described herein may take on any shape depending on the application. Deformable sensors 212 may be very flexible and thus deformable. This may be beneficial in human-robot interactions. In this way, the robot 200 may contact a person (e.g., to give the person a "hug") without causing harm due to the softness of the deformable sensors 212 and/or due to an ability to control the force of the contact with an object. The spatial resolution of one or more deformation sensors 212 in the arm portions 201, 202 may be high or low depending on the application. In the example of FIG. 2, the deformable sensors 214 near the base portion 203 of the robot 200 may have low spatial resolution, and may be configured to only detect contact with a target object. The deformability of deformable sensors 214 near the base of the robot 200 may be set based on the application of the robot 200. The depth resolution and/or spatial resolution of the sensors 210, 212, 214 may be varied along different parts of the robot 200. For example, for a portion 203 it may not be necessary to identify the shape and/or pose of an object coming into contact with a particular deformable sensor, as simply registering contact with an object may provide sufficient information, whereas contact with another portion (such as 201) may produce pose and/or shape information derived from the contact. As shown in FIG. 2, deformable sensors 210, 212, 214 may be of any suitable size, which may vary even within an arm portion. Although arm portions 201, 202, 203 are depicted as being discrete/non-overlapping, overlap may occur in other embodiments.

In embodiments, each of the deformable sensors 210, 212, and 214 may include the same number of time-of-flight emitters and a single time-of-flight receiver. For example, each of the deformable sensors 210, 212, and 214 may include four time-of-flight emitters and a single time-of-flight receiver as the deformable sensor 100 illustrated in FIGS. 1A and 1B. In some embodiments, the deformable sensors 210, 212, and 214 may include different numbers of time-of-flight emitters depending on the sizes of the deformable sensors 210, 212, and 214. For example, the size of the deformable sensor 210 may be the biggest and the size of the deformable sensor 214 may be the smallest. Thus, the distance between the time-of flight emitter and the deformable membrane of the deformable sensor 210 is the longest and the distance between the emitter and the deformable membrane of the deformable sensor 214 is the shortest. Since the distance between the emitter and the deformable membrane of the deformable sensor 210 is relatively long, the deformable sensor 210 may include small numbers of time-of-flight emitters, e.g., three emitters. In contrast, since the distance between the emitter and the deformable membrane of the deformable sensor 214 is relatively short, the deformable sensor 214 may include large numbers of time-of-flight emitters, e.g., six emitters.

It should now be understood that embodiments of the present disclosure are directed to detecting, using a time-of-flight sensor, a shape of the deformable membrane of a deformable sensor. Time of flight sensors generally need sufficient space to emit a signal and receive the reflected signal to accurately determine a distance. A deformable sensor may not have enough space for a time of flight sensor positioned within the deformable sensor to emit a signal and receive the signal reflected from a deformable membrane. When the distance between the deformable membrane and the time-of-flight becomes too short, the time-of-flight emitter may be too bright and the effect of the emitter-receiver offset become non-negligible. Embodiments of the present disclosure addresses the above issues resulting from close-range imaging. According to the present disclosure, a deformable sensor for detecting a pose and force associated with an object is provided. The deformable sensor includes a housing, a deformable membrane coupled to an upper portion of the housing, an enclosure defined by the housing and the deformable membrane and configured to be filled with a medium, a time-of-flight receiver positioned within the enclosure and a plurality of time-of-flight emitters arranged around the time-of-flight receiver within the enclosure. The plurality of time-of-flight emitters are configured to emit signals toward the deformable membrane at different times. That is, there is a time difference between when one of time-of-flight emitter emits signals toward the deformable membrane and when another time-of-flight emitter emits signals toward the deformable membrane. The time-of-flight receiver is configured to receive signals reflected from the deformable membrane. By staggering the emission of signals from emitters at different times, the glare and/or shadows can be determined from each sensed signals and mathematically eliminated or ignored when merging the data related to reflected signals originated from the plurality of time-of-emitters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
   a housing;
   a deformable membrane coupled to an upper portion of the housing;
   an enclosure defined by the housing and the deformable membrane and configured to be filled with a medium;
   a time-of-flight receiver positioned within the enclosure; and
   a plurality of time-of-flight emitters arranged around the time-of-flight receiver within the enclosure,
   wherein the plurality of time-of-flight emitters are configured to emit signals toward the deformable membrane at different times, and
   the time-of-flight receiver is configured to receive signals reflected from the deformable membrane.

2. The deformable sensor of claim 1, wherein each of the plurality of time-of-flight emitters is arranged at a predetermined distance from the time-of-flight receiver.

3. The deformable sensor of claim 1, wherein the plurality of time-of-flight emitters are equally spaced apart from each other.

4. The deformable sensor of claim 1, wherein the plurality of time-of-flight emitters include three or more time-of-flight emitters.

5. The deformable sensor of claim 1, wherein a distance between the deformable membrane and the time-of-flight receiver is less than 0.5 meter.

6. The deformable sensor of claim 1, wherein the plurality of time-of-flight emitters are configured to emit the signals toward the deformable membrane in a predetermined order.

7. The deformable sensor of claim 1, wherein the deformable membrane is made of latex.

8. The deformable sensor of claim 1, further comprising:
   a processor configured to:
   receive the signals reflected from the deformable membrane;
   obtain a plurality of three dimensional raw data based on the signals; and
   obtain a depth image of the deformable membrane based on the plurality of three dimensional raw data.

9. The deformable sensor of claim 8, wherein the processor is further configured to:
   merge the plurality of three dimensional raw data; and
   obtain a depth image of the deformable membrane based on the merged plurality of three dimensional raw data.

10. A method for detecting an object using a deformable sensor comprising a plurality of time-of-flight emitters and a time-of-flight receiver, the method comprising:
    emitting, using the plurality of time-of-flight emitters arranged around the time-of-flight receiver within an enclosure defined by a housing and a deformable membrane coupled to an upper portion of the housing, signals at different times; and
    receiving, by the time-of-flight receiver, the signals reflected from the deformable membrane,
    wherein the plurality of time-of-flight emitters are arranged at a predetermined distance from the time-of-flight receiver.

11. The method of claim 10, further comprising:
    obtaining a plurality of three dimensional raw data based on the reflected signals;
    merging the plurality of three dimensional raw data; and
    obtaining a depth image based on the merged plurality of three dimensional raw data.

12. The method of claim 10, wherein each of the plurality of time-of-flight emitters is arranged at a predetermined distance from the time-of-flight receiver.

13. The method of claim 10, wherein the plurality of time-of-flight emitters are equally spaced apart from each other.

14. The method of claim 10, wherein the plurality of time-of-flight emitters are configured to emit the signals toward the deformable membrane in a predetermined order.

15. A controller for a deformable sensor comprising a housing, a deformable membrane coupled to an upper portion of the housing, and an enclosure defined by the housing and the deformable membrane and configured to be filled with a medium, the controller comprising:
    one or more processors;
    one or more memory modules communicatively coupled to the one or more processors; and
    machine readable instructions stored in the one or more memory modules that, when executed by the one or more processors, cause the one or more processors to perform at least the following:
    instruct a plurality of time-of-flight emitters arranged around a time-of-flight receiver within the enclosure to emit signals at different times; and
    obtain, from the time-of-flight receiver within the enclosure, the signals reflected from the deformable membrane.

16. The controller of claim 15, wherein the machine readable instructions stored in the one or more memory modules, when executed by the one or more processors, cause the one or more processors to:
    obtain a plurality of three dimensional raw data based on the reflected signals;
    merge the plurality of three dimensional raw data; and
    obtain a depth image based on the merged plurality of three dimensional raw data.

17. The controller of claim 15, wherein each of the plurality of time-of-flight emitters is arranged at a predetermined distance from the time-of-flight receiver.

18. The controller of claim 15, wherein the plurality of time-of-flight emitters are equally spaced apart from each other.

19. The controller of claim 15, wherein the machine readable instructions stored in the one or more memory modules, when executed by the one or more processors, cause the one or more processors to:
  instruct the plurality of time-of-flight emitters to emit the signals toward the deformable membrane in a predetermined order.

20. The controller of claim 15, wherein the plurality of time-of-flight emitters include three or more time-of-flight emitters.

* * * * *